(12) United States Patent
Nakata

(10) Patent No.: US 10,871,936 B2
(45) Date of Patent: Dec. 22, 2020

(54) PLAYBACK DEVICE

(71) Applicant: Funai Electric Co., Ltd., Osaka (JP)

(72) Inventor: Eiji Nakata, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 130 days.

(21) Appl. No.: 15/918,202

(22) Filed: Mar. 12, 2018

(65) Prior Publication Data

US 2018/0293046 A1 Oct. 11, 2018

(30) Foreign Application Priority Data

Apr. 11, 2017 (JP) ................................. 2017-078106

(51) Int. Cl.
| | | |
|---|---|---|
| *G06F 3/16* | (2006.01) | |
| *G11B 27/10* | (2006.01) | |
| *G11B 27/00* | (2006.01) | |
| *G10L 13/00* | (2006.01) | |

(52) U.S. Cl.
CPC .............. *G06F 3/165* (2013.01); *G10L 13/00* (2013.01); *G11B 27/005* (2013.01); *G11B 27/10* (2013.01)

(58) Field of Classification Search
CPC ....... G06F 3/165; G11B 27/005; G11B 27/10; G10L 13/043
USPC .......................................................... 386/338
See application file for complete search history.

(56) References Cited

U.S. PATENT DOCUMENTS

| | | | | |
|---|---|---|---|---|
| 4,896,337 A | * | 1/1990 | Bushy, Jr. .......... | G11B 20/1403 327/261 |
| 5,173,888 A | * | 12/1992 | An ......................... | G11B 19/02 360/51 |
| 5,715,370 A | * | 2/1998 | Luther ...................... | G06F 3/16 704/260 |
| 7,024,363 B1 | * | 4/2006 | Comerford ............ | G10L 15/22 704/270 |
| 2007/0003215 A1 | * | 1/2007 | Ito ........................ | G11B 27/005 386/344 |
| 2007/0098369 A1 | * | 5/2007 | Tsai ..................... | G11B 27/005 386/343 |
| 2007/0223885 A1 | * | 9/2007 | Kuno ..................... | G10L 19/16 386/231 |
| 2007/0274676 A1 | * | 11/2007 | Diomelli ................ | G11B 27/10 386/205 |
| 2008/0162151 A1 | * | 7/2008 | Cho ........................ | G10L 21/04 704/503 |
| 2009/0074204 A1 | * | 3/2009 | Nakamura .............. | G10L 21/04 381/98 |

(Continued)

FOREIGN PATENT DOCUMENTS

JP         2007-257701 A     10/2007

*Primary Examiner* — Loi H Tran
(74) *Attorney, Agent, or Firm* — Global IP Counselors, LLP

(57) ABSTRACT

A playback device includes a first generator, a second generator and a combiner. The first generator processes main audio data to output first audio data. The second generator processes additional audio data to output second audio data. The combiner combines the first audio data with the second audio data. While a sampling frequency of the main audio data is different from a sampling frequency of the additional audio data, the second generator generates the second audio data to adjust a playback speed of the additional audio data based on the sampling frequency of the main audio data.

19 Claims, 5 Drawing Sheets

(56) References Cited

U.S. PATENT DOCUMENTS

| | | | | |
|---|---|---|---|---|
| 2011/0066263 A1* | 3/2011 | Iwai | ................ | G10L 19/22 |
| | | | | 700/94 |
| 2012/0054796 A1* | 3/2012 | Gagnon | ................ | H04N 5/602 |
| | | | | 725/40 |
| 2014/0341396 A1* | 11/2014 | Isberg | ................ | G11B 27/034 |
| | | | | 381/107 |

* cited by examiner

PLAYBACK DEVICE

CROSS-REFERENCE TO RELATED APPLICATIONS

This application claims priority to Japanese Patent Application No. 2017-078106 filed on Apr. 11, 2017. The entire disclosure of Japanese Patent Application No. 2017-078106 is hereby incorporated herein by reference.

BACKGROUND

Field of the Invention

This invention generally relates to a playback device.

Background Information

The FCC (Federal Communications Commission) in the United States of America mandates the installation of a function called TTS (Text-To-Speech). This TTS function provides an audible readout of the system status and text data menus of the OSD (on-screen display). With this TTS function, the various functions of video devices, such as digital video players, digital video recorders and the like, can be utilized by individuals who are blind or visually impaired. For this reason, video devices are required to come with this TTS function. Japanese Patent Application Publication No. 2007-257701 (Patent Literature 1) discloses a playback device for playing video content.

For example, with this TTS function, when the power of a video device is turned on via a remote control, audio indicating power-on of the video device can be outputted. Also, for example, when channels are switched, audio indicating a selected channel number, contents of the program currently being broadcast on the selected channel.

SUMMARY

However, when main audio data included in video data played by a video device, such as video data stored on a Blu-ray Disc™, is mixed with additional audio data produced by the TTS function, the playback speed of the main audio data and the playback speed of the additional audio data can be different from each other.

One object is to provide a playback device with which the playback speed of the additional audio data is synchronized with the playback speed of the main audio data.

In view of the state of the known technology and in accordance with an aspect of the present invention, a playback device includes a first generator, a second generator and a combiner. The first generator processes main audio data to output first audio data. The second generator processes additional audio data to output second audio data. The combiner combines the first audio data with the second audio data. While a sampling frequency of the main audio data is different from a sampling frequency of the additional audio data, the second generator generates the second audio data to adjust a playback speed of the additional audio data based on the sampling frequency of the main audio data.

Also other objects, features, aspects and advantages of the present disclosure will become apparent to those skilled in the field of control methods from the following detailed description, which, taken in conjunction with the annexed drawings, discloses several embodiments of playback devices with various features.

BRIEF DESCRIPTION OF THE DRAWINGS

Referring now to the attached drawings which form a part of this original disclosure.

DETAILED DESCRIPTION OF EMBODIMENTS

Figure 1:
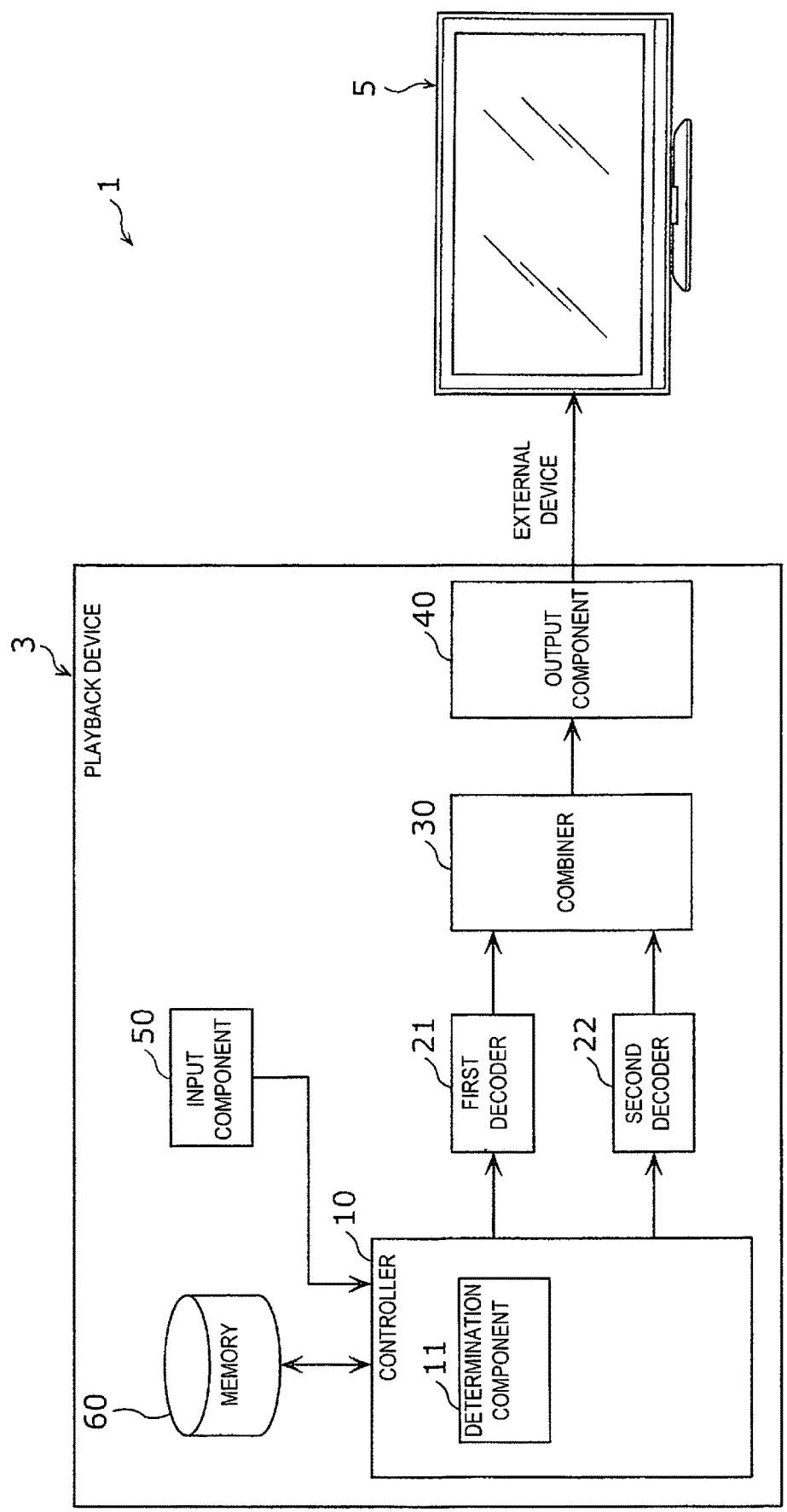
FIG. 1 is a block diagram of a playback device of a video system in accordance with a first embodiment and a third embodiment.

Selected embodiments will now be explained with reference to the drawings. It will be apparent to those skilled in the field of playback devices from this disclosure that the following descriptions of the embodiments are provided for illustration only and not for the purpose of limiting the invention as defined by the appended claims and their equivalents. Numerical values, shapes, materials, constituent elements, layout positions of constituent elements, connection modes, steps, step order, and the like shown in the following embodiments are merely examples, and are not intended to limit the present invention. Also, of the constituent elements in the following embodiments, those constituent elements not described in an independent claim are described as optional constituent elements. In the drawings, dimensions, dimensional ratios, and so forth are not necessarily depicted exactly.

In the drawings, components that have substantially the same configuration are numbered the same, and redundant description will be omitted or simplified.

First Embodiment

Configuration

Figure 2:
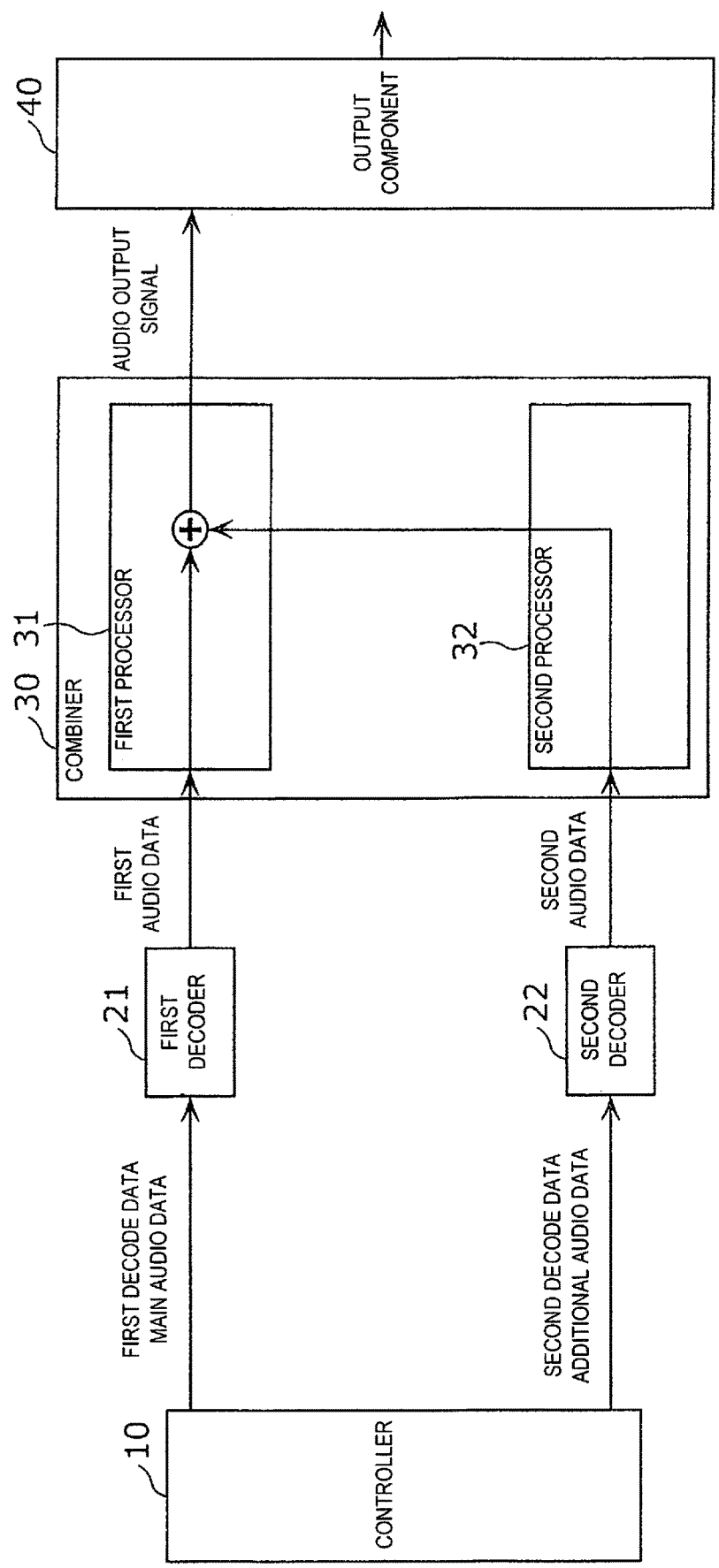
FIG. 2 is a block diagram of a playback device in accordance with the first embodiment, a second embodiment and the third embodiment, illustrating a controller, a first decoder, a second decoder, a combiner and an output component of the playback device.

FIG. 1 is a block diagram of a video system 1 pertaining to a first embodiment. As illustrated in FIG. 1, the video system 1 includes a playback device 3 and an external device 5. FIG. 2 is a block diagram of the playback device 3. As illustrated in FIGS. 1 and 2, the playback device 3 includes a controller 10, a first decoder 21 (e.g., a first generator), a second decoder 22 (a second generator), a combiner 30, and an output component 40. In the illustrated embodiment, the block diagrams illustrated in FIGS. 1 and 2 mainly shows configurations related to audio playback. Of course, the playback device 3 includes configurations related to video playback. However, the configurations related to video playback are relatively conventional, and thus will not be discussed in detail for the sake of brevity.

In the illustrated embodiment, the playback device 3 is, for example, a Blu-ray Disc™ player, and is a device that plays data stored on a BD (Blu-ray disc) or the like. However, the playback device 3 can be other type of playback devices, such as a DVD (digital versatile disc) player, an HDD (hard disk drive) and the like. The playback device 3 can have a recording function, and is not limited to a function of just playing data stored on a storage medium such as a BD, DVD, HDD, or the like. The playback device 3 can be other types of playback devices that can play video and/or audio content. In the illustrated embodiment, the external device 5 is, for example, a television. It should be noted that the external device 5 is not limited to a television. The external device 5 can be a display, such as a liquid crystal display, that is capable of outputting video and audio. Also, the external device 5 can be other types of output devices, such audio devices, that are capable of outputting at least audio.

The playback device 3 and the external device 5 are connected together via an HDMI™ (High-Definition Multimedia Interface) cable, for example. An HDMI cable is a cable that conforms to the HDMI standard. The HDMI standard is a standard specification of a communication interface for transmitting video and audio as digital signals. Of course, the playback device 3 and the external device 5 can be other type of devices that conform with other type of digital communication standards, and can be connected via other type of digital cables for transmitting and receiving digital signals.

The playback device 3 transmits to the external device 5 a control signal for controlling the external device 5 and a signal indicating attribute information that causes the external device 5 to output audio and video. The control signal includes, for example, a command for turning the power on or off. This command corresponds to additional audio data of the TTS function (discussed below) installed in the playback device 3, for example. The signal indicating the attribute information includes main audio data and video data stored in a storage medium, and the additional audio data converted from text data into audio by the TTS function. There is not necessarily any corresponding text data in the command.

Here, the main audio data is compressed by a compression method such as MP3, AAC, or another such international standard, for example. The video data is compressed according to H.264, MPEG4, or another such method for compressing video data involving media integration video compression, for example. The main audio data and the video data are not limited to being compressed data, and can instead be uncompressed data. Also, the additional audio data can be uncompressed audio data in PCM format, WAV format, or the like, or compressed data, for example.

As shown in FIGS. 1 and 2, the playback device 3 has the controller 10, the first decoder 21, the second decoder 22, the combiner 30 and the output component 40. Also, the playback device 3 has an input component 50 and a memory 60.

The controller 10 controls the operation of a driver, the first decoder 21, the second decoder 22, the combiner 30, the input component 50, the memory 60, etc.

When a control signal has been received from the external device 5 or the input component 50, the controller 10 controls the playback device 3 based on the control signal. For example, the control signal is sent back and forth between a plurality of HDMI devices according to CEC (Consumer Electronics Control) for linking among a plurality of HDMI devices in HDMI standard. This CEC communication makes it possible to switch on the power and switch the input of the external device 5 in conjunction with the power-on of the playback device 3, for example. Also, a remote control of the external device 5 can be used to operate the playback device 3, for example.

The controller 10 has a determination component 11. The determination component 11 determines the multiple by which to adjust the playback speed of the additional audio data based on the sampling frequency of the main audio data decoded by the first decoder 21, from the sampling frequency of the main audio data included in the data played from the storage medium and the sampling frequency of the additional audio data stored in the memory 60. The adjustment of the playback speed of the additional audio data referred to here encompasses not only when the playback speed of the additional audio data is matched to the playback speed of the main audio data, but also when the playback speed of the additional audio data is brought closer to the playback speed of the main audio data.

The controller 10 generates first decode data designating the type of main audio data to be decoded (e.g., an encoding type of the main audio data) from the main audio data included in the data played from the storage medium. The controller 10 outputs the main audio data included in the data played from the storage medium by the driver and the first decode data to the first decoder 21.

The controller 10 generates second decode data including information related to the multiple by which the playback speed of the additional audio data is to be adjusted as determined by the determination component 11, and information for designating the type of additional audio data to be decoded (e.g., an encoding type of the additional audio data). The controller 10 determines from the memory 60 the additional audio data corresponding to the text data included in the control signal, and outputs this additional audio data and the second decode data to the second decoder 22. Thus, the controller 10 outputs the additional audio data based on an operational command to the playback device 3.

The controller 10 is a processor capable of controlling the operation of the storage medium, and executes the OS and the player application loaded from the memory 60. More specifically, the controller 10 is realized by a processor, a microcomputer, a dedicated circuit, or the like. In the illustrated embodiment, the controller 10 can further include other conventional components such as an input interface circuit, an output interface circuit, and storage devices, such as a ROM (Read Only Memory) device and a RAM (Random Access Memory) device, flash memory, etc. For example, the internal RAM of the controller 10 stores processing results of the controller 10. The internal ROM of the controller 10 stores the information and programs for various operations. It will be apparent to those skilled in the art from this disclosure that the precise structure and algorithms for the controller 10 can be any combination of hardware and software that will carry out the functions of the playback device 3 as described herein.

The first decode data and the second decode data include commands designated by the controller 10 for causing the first decoder 21 and the second decoder 22 to do specific decoding, from among a plurality of predetermined types of decoding. The second decode data further includes a command for causing the second decoder 22 to adjust the playback speed of the additional audio data based on the sampling frequency of the main audio data.

The first decoder 21 is a decoder that decodes the main audio data inputted from the driver via the controller 10, and outputs the first audio data. Here, the main audio data is compressed and encoded using any one of a plurality of predetermined types of compression encoding. The first decoder 21 has decoding functions corresponding to each of a plurality of types of compression encoding. The first decoder 21 receives the first decode data of the type to be decoded as designated by the controller 10. The first decoder 21 decodes using a decoding function corresponding to the type of compression encoding based on the first decode data, and generates the first audio data. The first decoder 21 outputs the generated first audio data to a first processor 31 (discussed below) of the combiner 30. Thus, the first decoder 21 generates the first audio data based on the main audio data and the first decode data. More specifically, the first decoder 21 decodes the main audio data based on the first decode data to generate the first audio data.

In the illustrated embodiment, the sampling frequency of the main audio data inputted to the first decoder 21 is, for instance, 32 kHz, 44.1 kHz, 48 kHz, 96 kHz, or the like. If the sampling frequency of the main audio data is 48 kHz, then the first decoder 21 can increase (up-convert) the sampling frequency of the main audio data from 48 kHz to 96 kHz based on the first decode data. In this case, the main audio data whose sampling frequency has been increased to 96 kHz is becomes first audio data.

The second decoder 22 decodes the additional audio data outputted from the controller 10 and outputs the second audio data. That is, the second decoder 22 is a decoder that decodes the additional audio data inputted from the driver via the controller 10 into audio data.

The second decoder 22 has decoding functions corresponding to each of a plurality of types of compression encoding. The second decoder 22 receives the second decode data of the type to be decoded as designated by the controller 10. The second decoder 22 decodes using a decoding function corresponding to the type of compression encoding based on the second decode data, and generates the second audio data. More specifically, if the sampling frequency of the main audio data is different from the sampling frequency of the additional audio data, then the second decoder 22 generates the second audio data in which the playback speed of the additional audio data has been adjusted based on the sampling frequency of the main audio data. The second decoder 22 outputs the generated second audio data to a second processor 32 in FIG. 2 (discussed below) of the combiner 30. Thus, the second decoder 22 generates the second audio data based on the additional audio data and the second decode data. More specifically, the second decoder 22 decodes the additional audio data based on the second decode data to generate the second audio data.

If the sampling frequency of the additional audio data is higher than the sampling frequency of the main audio data, the second decoder 22 increases the playback speed of the additional audio data based on the sampling frequency of the main audio data. If the sampling frequency of the additional audio data is lower than the sampling frequency of the main audio data, then the second decoder 22 decreases the playback speed of the additional audio data based on the sampling frequency of the main audio data. More specifically, in the illustrated embodiment, the determination component 11 of the controller 10 determines the multiple by which to adjust the playback speed of the additional audio data to match with the playback speed of the main audio data based on the sampling frequency of the main audio data and the sampling frequency of the additional audio data. Then, the second decoder 22 adjust the playback speed of the additional audio data based on the multiple determined by the determination component 11 of the controller 10.

In the illustrated embodiment, the sampling frequency of the additional audio data inputted to the second decoder 22 is, for example, 12 kHz. If the sampling frequency of the main audio data is 96 kHz, then the second decoder 22 sets the sampling frequency of the additional audio data to 96 kHz so as to match the sampling frequency of the main audio data. In this case, the playback speed of the additional audio data ends up being increased to eight times. Accordingly, the second decoder 22 generates the second audio data in which the playback speed of the additional audio data has been set to ⅛ based on the sampling frequency of the main audio data, based on the second decode data.

The combiner 30 executes mixing processing in which the first audio data outputted from the first decoder 21 and the second audio data outputted from the second decoder 22 are combined, to generate an audio output signal.

As shown in FIGS. 1 and 2, the combiner 30 has the first processor 31 that performs specific processing on the first audio data outputted from the first decoder 21, and the second processor 32 that performs specific processing on the second audio data outputted from the second decoder 22.

At the first processor 31, the first audio data outputted from the first decoder 21 and the second audio data outputted via the second processor 32 from the second decoder 22 are combined, mixing processing is performed, and an audio output signal is generated. The audio output signal generated by the combiner 30 is sent to the output component 40, and outputted from the output component 40 to the external device 5 via the HDMI cable. In the illustrated embodiment, the first decoder 21 and the second decoder 22 independently decode the first decode data and the second decode data, respectively. The first decoder 21 and the second decoder 22 can be any combination of hardware and software that will carry out the above-mentioned decoding functions. Also, the first decoder 21 and the second decoder 22 can be formed by a single IC (integrated circuit) or separate ICs. Also, in the illustrated embodiment, the controller 10, the first decoder 21, the second decoder 22 and the combiner 30 can be formed by a single IC or separate ICs.

The input component 50 accepts an instruction from the user from a list of operation menus displayed on the screen of the external device 5. The input component 50 is also, for example, a device that accepts commands outputted from the operation panel of the playback device 3 or a remote control.

The output component 40 is, an AV (audio-visual) interface, such as a HDMI module, for example. The output component 40 and transmits and receives attribute information and the like to and from the external device 5. The attribute information includes audio data and video data, for example. Of course, the output component 40 can be other types of AV interface as needed and/or desired.

The driver is a drive unit for driving a storage medium in which is stored audio/video content corresponding to the storage medium standard, and records and plays data to and from the storage medium. More specifically, the driver controls the operation of a laser light source that emits a laser at the storage medium, an optical pickup having a photosensor or the like that detects a laser reflected by the storage medium, a spindle motor that rotates the storage medium, and so on. The driver outputs data played from the storage medium to the controller 10, for example. More specifically, in the illustrated embodiment, the driver is an optical disc player, such as a DVD player or a BD player, for example. In this case, the driver has an optical disc drive for playback of the optical disc and a signal processor for outputting the audio/video content to the controller 10. The detailed configuration of the driver is relatively conventional, and thus will not be discussed in detail herein. Of course, the driver can be other types of medium player for playing the audio/video content stored on a storage device internally or externally provided relative to the playback device 3.

The memory 60 is a storage medium or computer memory that stores the additional audio data. Also, the memory 60 can store player applications, an operating system, and so forth. Part of the storage area in the memory 60 is used as a video memory (VRAM). Part of the storage area in the memory 60 does not necessarily have to be used as a VRAM, and a dedicated memory independent of the memory 60 can be used as the VRAM instead.

When a control signal is received from the playback device 3, the external device 5 operates based on the control signal. Furthermore, when the audio data and video data corresponding to the control signal are received from the playback device 3, the external device 5 outputs audio and video based on this audio data and video data.

Operation

The operation of the video system 1 configured as above will now be described through reference to FIGS. 1 to 3.

Figure 3:
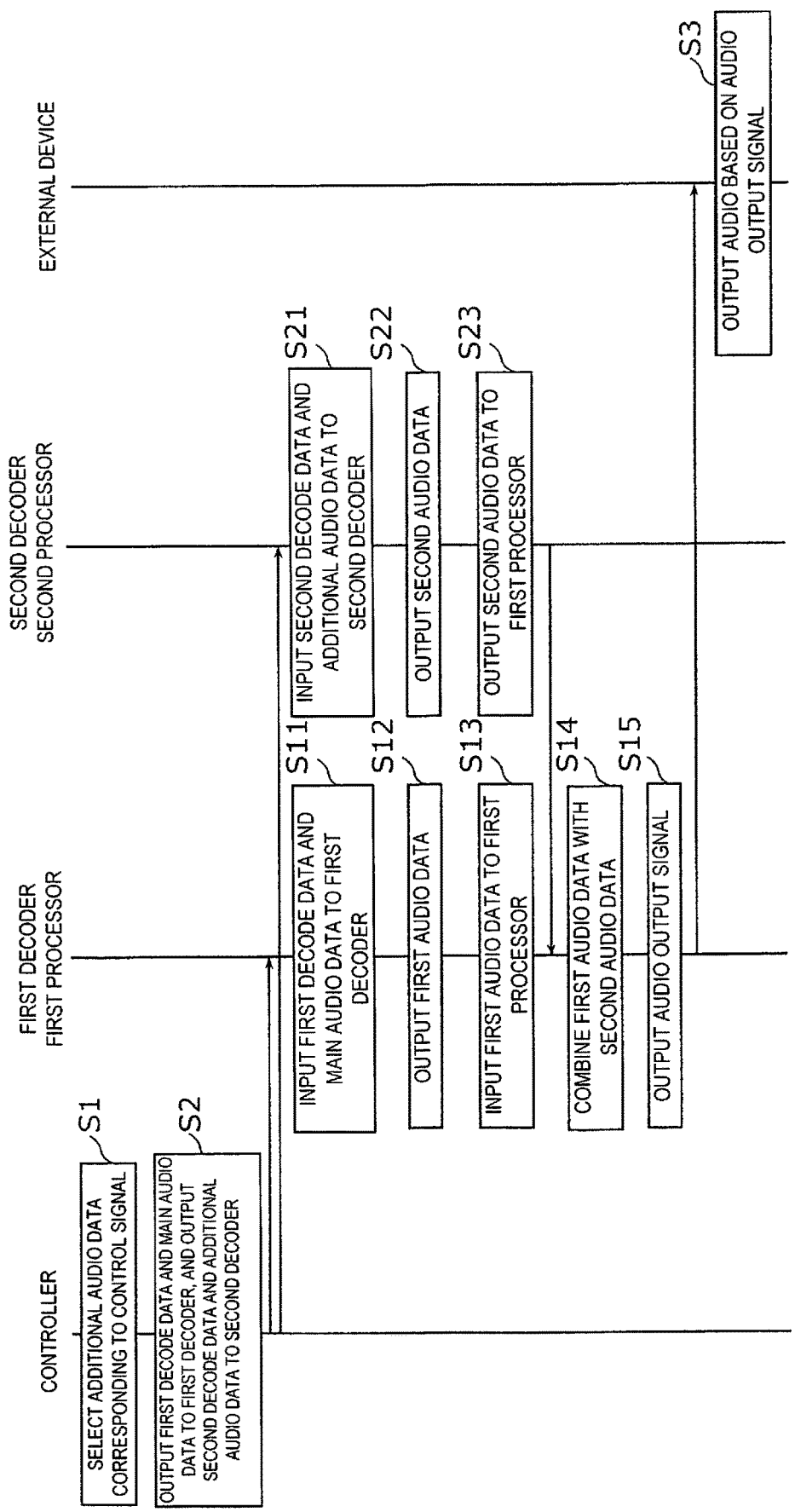
FIG. 3 is a sequence diagram showing the operation of the video system in accordance with the first embodiment, the second embodiment and the third embodiment.

FIG. 3 is a sequence diagram showing the operation of the video system 1 pertaining to first to third embodiments.

As shown in FIGS. 1 to 3, first, the controller 10 receives a control signal from the external device 5 or the input component 50. The controller 10 selects the additional audio data corresponding to the control signal (S1).

Next, the controller 10 outputs to the first decoder 21 the first decode data and the main audio data of the audio from the data played from the storage medium by the driver. Also, the controller 10 outputs to the second decoder 22 the second decode data and the additional audio data selected from the additional audio file of the memory 60 (S2).

Next, the first decode data and the main audio data of the audio from the data played from the storage medium by the driver are inputted to the first decoder 21 (S11). Also, the second decode data and the additional audio data selected from the additional audio file of the memory 60 are inputted to the second decoder 22 (S21).

Next, the first decoder 21 decodes the main audio data based on the first decode data and outputs the first audio data (S12). Also, the second decoder 22 decodes the additional audio data based on the second decode data and outputs the second audio data (S22). Here, since the additional audio data is decoded based on the second decode data, the second decoder 22 outputs second audio data in which the playback speed of the additional audio data has been adjusted based on the sampling frequency of the main audio data. Thus, in the illustrated embodiment, the first decoder 21 processes the main audio data to output the first audio data, while the second decoder 22 processes the additional audio data to output the second audio data.

Next, the first audio data is inputted to the first processor 31 of the combiner 30, and specific processing is performed by the first processor 31 (S13). The second audio data is inputted to the second processor 32 of the combiner 30, subjected to specific processing by the second processor 32, and outputted to the first processor 31 (S23).

Next, the first processor 31 of the combiner 30 combines the first audio data with the second audio data inputted from the second processor 32 (S14). Then, the first processor 31 generates an audio output signal, and the combiner 30 outputs the audio output signal (S15).

This audio output signal is inputted to the external device 5 via the output component 40 and the HDMI cable. The external device 5 then outputs the audio based on the audio output signal (S3). Here, the audio outputted from the external device 5 is audio in which additional audio data has been added to the main audio data. This flow is then ended.

Since the second decoder 22 thus adjusts the playback speed of the additional audio data based on the sampling frequency of the main audio data, with this playback device 3, the playback speed of the additional audio data is unlikely to be higher or lower than the playback speed of the main audio data. Accordingly, the TTS function for supporting the operation of digital equipment by a user who is blind or visually impaired is less likely to be lost. As a result, a user who is blind or visually impaired can reliably recognize the main audio data and the additional audio data.

Action and Effect

The action and effect of the playback device 3 in this embodiment will now be described.

As described above, the playback device 3 in this embodiment comprises the first decoder 21 that decodes the main audio data and outputs the first audio data, the second decoder 22 that decodes the additional audio data and outputs the second audio data, and the combiner 30 that mixes the first audio data with the second audio data. If the sampling frequency of the main audio data is different from the sampling frequency of the additional audio data, then the second decoder 22 adjusts the playback speed of the additional audio data based on the sampling frequency of the main audio data.

Thus, if the sampling frequency of the main audio data is different from the sampling frequency of the additional audio data, then the second decoder 22 generates the second audio data so as to adjust the playback speed of the additional audio data based on the sampling frequency of the main audio data. Therefore, with this playback device 3, in the mixing of the first audio data and the second audio data at the combiner 30, audio data can be outputted in which the playback speed of the additional audio data is synchronized with the playback speed of the main audio data.

Therefore, the playback speed of the additional audio data can be synchronized with the playback speed of the main audio data. This means that a user who is blind or visually impaired can correctly operate the playback device 3 and the external device 5.

Also, in the playback device 3 pertaining to this embodiment, if the sampling frequency of the additional audio data is higher than the sampling frequency of the main audio data, then the second decoder 22 generates the second audio data so as to increase the playback speed of the additional audio data.

With this configuration, since the second decoder 22 increases the playback speed of the additional audio data, the playback speeds of the main audio data and the additional audio data can be synchronized.

Also, in the playback device 3 pertaining to this embodiment, if the sampling frequency of the additional audio data is lower than the sampling frequency of the main audio data, then the second decoder 22 generates the second audio data so as to decrease the playback speed of the additional audio data.

With this configuration, since the second decoder 22 decreases the playback speed of the additional audio data, the playback speeds of the main audio data and the additional audio data can be synchronized.

Second Embodiment

Configuration

Figure 4:
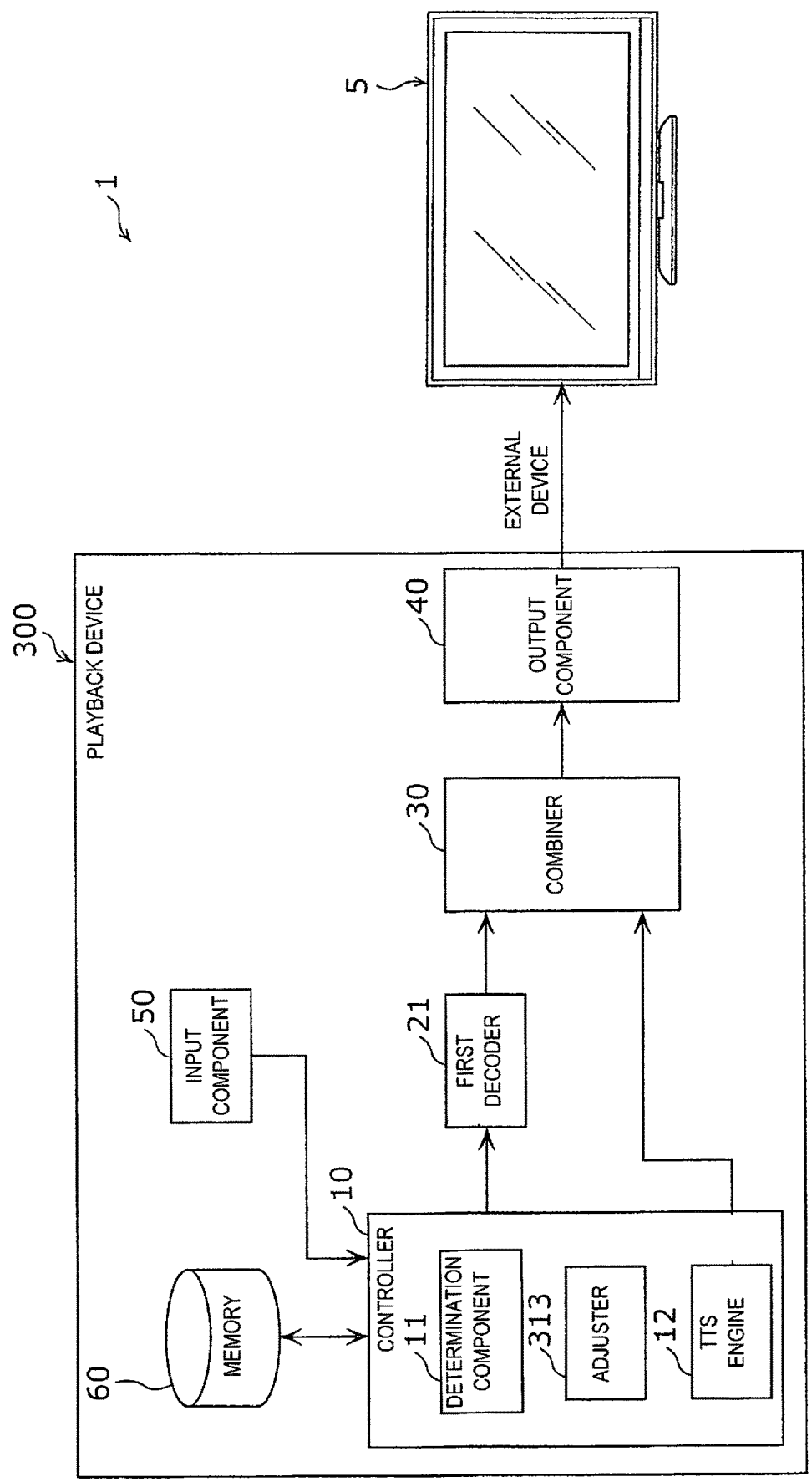
FIG. 4 is a block diagram of a playback device of a video system in accordance with the second embodiment.

The configuration of a video system 1 pertaining to a second embodiment will be described through reference to FIG. 4. As illustrated in FIG. 4, the video system 1 pertaining to the second embodiment includes a playback device 300.

FIG. 4 is a block diagram showing the playback device 300 pertaining to the second embodiment.

This embodiment differs from the first embodiment in that the playback speed of additional audio data is adjusted using the parameters of a TTS engine 12 (e.g., an additional audio data generator) and/or an adjuster 313, instead of the second decoder 22 in the first embodiment. Unless otherwise specified, the video system 1 in this embodiment is the same as the video system 1 in the first embodiment, so those components that are the same will be numbered the same, and detailed description related to their configuration will be omitted.

As shown in FIG. 4, the controller 10 of the playback device 300 has the TTS engine 12 and the adjuster 313 in addition to the determination component 11. The TTS engine 12 and the adjuster 313 form a second generator of the present disclosure.

The TTS engine 12 is a program that is provided in the firmware that the controller 10 already has, and converts a plurality of sets of text data into audio data (i.e., additional audio data). TTS engine 12 converts the text data included in the control signal from the external device 5 or the input component 50 into the additional audio data, and outputs the result to the combiner 30. Thus, the TTS engine 12 generates the additional audio data. In the illustrated embodiment, the TTS engine 12 generates the additional audio data based on an operational command to the playback device 3.

TTS engine 12 has a TTS function. Here, a TTS function is a function that converts text data into audio data, and outputs this audio data. In this embodiment, TTS function refers to an audio output function for supporting the operation of a digital device by a user who is blind or visually impaired. More specifically, "TTS function" means a function of outputting the additional audio data corresponding to control signals transmitted and received between the playback device 300 and the external device 5. Thus, in the illustrated embodiment, the TTS engine 12 generates the additional audio data by converting text data indicative of the operational command to the playback device 3 into the additional audio data.

The determination component 11 determines the multiple by which the playback speed of the additional audio data will be adjusted, based on the sampling frequency of the main audio data, from the sampling frequency of the main audio data included in data played from the storage medium, and the sampling frequency of the additional audio data produced by the TTS engine 12.

The determination component 11 determines whether or not the sampling frequency of the additional audio data can be adjusted to the sampling frequency of the main audio data. If the determination component 11 determines that the sampling frequency of the additional audio data cannot be adjusted to the sampling frequency of the main audio data, then data related to the sampling frequency of the main audio data is outputted to the adjuster 313.

The adjuster 313 is a frequency conversion circuit, a program, or the like that adjusts the playback speed of the additional audio data to generate second audio data. The adjuster 313 adjusts the playback speed of the additional audio data based on the data related to the inputted sampling frequency of the main audio data (e.g., sampling frequency of the first audio data).

Adjustment of the playback speed of the additional audio data will be described. The TTS engine 12 uses API (Application Programming Interface) to convert a character string into PCM (pulse code modulation) audio data (i.e., additional audio data). More specifically, the TTS engine 12 outputs the desired PCM audio data by designating the character string, volume, playback speed, pitch, sampling frequency, language (Japanese, English, etc.), etc., in the additional audio data. The outputted PCM audio data is inputted to the combiner 30.

The determination component 11 of the controller 10 determines whether or not the TTS engine 12 can convert the sampling frequency of the additional audio data. More specifically, there can be situations when the determination component 11 cannot produce additional audio data that is a multiple of the sampling frequency of the main audio data, using the library of the TTS engine 12 of the controller 10. The sampling frequencies of the additional audio data that can be converted from text data are limited because of the limitation of the memory capacity of the controller 10 and so forth. Thus, it is difficult to further covert the sampling frequency of the additional audio data so as to be adjusted to all possible sampling frequencies of the main audio data.

Accordingly, if the determination component 11 determines that the sampling frequency of the additional audio data cannot be adjusted into the sampling frequency of the main audio data, then the adjuster 313 of the controller 10 adjusts the playback speed of the additional audio data based on the sampling frequency of the main audio data. More specifically, the adjuster 313 adjust the playback speed of the additional audio data to synchronize the playback speed of the additional audio data with the playback speed of the main audio data. On the other hand, if the determination component 11 determines that the sampling frequency of the additional audio data can be adjusted into the sampling frequency of the main audio data, then the TTS engine 12 produces the additional audio data such that the sampling frequency of the additional audio data matches with the sampling frequency of the main audio data, and output the additional audio data as the second audio data. In this case, the adjustment of the playback speed of the additional audio data is performed by the library of the TTS engine 12. Thus, the adjuster 313 adjusts the playback speed of the additional audio data that has been generated by the TTS engine 12 while the sampling frequency of the additional audio data is unadjustable to the sampling frequency of the main audio data. On the other hand, the TTS engine 12 generates the additional audio data with the sampling frequency that has been adjusted to the sampling frequency of the main audio data while the sampling frequency of the additional audio data is adjustable to the sampling frequency of the main audio data.

Action and Effect

Next, the action and effect of the playback device 300 in this embodiment will be described.

As described above, the playback device 300 pertaining to this embodiment further comprises the controller 10 that determines whether or not the sampling frequency of the additional audio data can be adjusted to the sampling frequency of the main audio data. Then, if the sampling frequency of the additional audio data cannot be adjusted to the sampling frequency of the main audio data, then the controller 10 adjusts the playback speed of the additional audio data based on the sampling frequency of the main audio data.

In particular, the adjuster 313 or the TTS engine 12 of the controller 10 adjusts the playback speed of the additional audio data based on the sampling frequency of the main audio data, which allows the playback device 300 to synchronize the playback speed of the additional audio data with the playback speed of the main audio data.

The other actions and effects in this embodiment are the same as the actions and effects in the first embodiment and so forth.

Third Embodiment

Configuration

The configuration of a video system 1 pertaining to a third embodiment will be described through reference to FIGS. 1 and 2.

This embodiment differs from the first embodiment in that the second processor 32 (e.g., the converter) adjusts the audio level of the additional audio data. Unless otherwise specified, the video system 1 in this embodiment is the same as the video system 1 in the first embodiment, so those components that are the same will be numbered the same, and detailed description related to their configuration will be omitted.

In the illustrated embodiment, the second decoder 22 calculates the audio level of the additional audio data, generates second audio data and information indicating the audio level, and outputs the information indicating the audio level and the second audio data to the second processor 32. The "audio level" referred to here is the audio volume.

In the illustrated embodiment, the combiner 30 has the second processor 32 that generates the second audio data in which the audio level of the additional audio data has been raised, if the audio level of the additional audio data is at or below a first threshold value. The second processor 32 determines whether or not the audio level of the additional audio data is at or below the first threshold value, and generates the second audio data in which the audio level has been raised.

More specifically, if the second processor 32 determines that the audio level of the additional audio data is at or below the first threshold value based on the information indicating the audio level, then the second processor 32 generates the second audio data in which the audio level of the additional audio data has been raised, and outputs this second audio data. That is, since it is conceivable that the audio level of the additional audio data is so low the sound is hard to hear, the second processor 32 raises the audio level of the additional audio data. Thus, the second processor 32 processes the second audio data from the second decoder 22 to raise the audio level of the additional audio data while the audio level of the additional audio data is at or below the first threshold value.

Also, if the second processor 32 determines that the audio level of the additional audio data based on the information indicating the audio level is at or above a second threshold that is higher than the first threshold value, then the second processor 32 generates the second audio data in which the audio level of the additional audio data has been decreased, and outputs this second audio data. That is, since it is possible that the audio level of the additional audio data is too high, the second processor 32 lowers the audio level of the additional audio data. Thus, the second processor 32 processes the second audio data from the second decoder 22 to lower the audio level of the additional audio data while the audio level of the additional audio data is at or above the second threshold value that is higher than the first threshold value.

Operation

Figure 5:
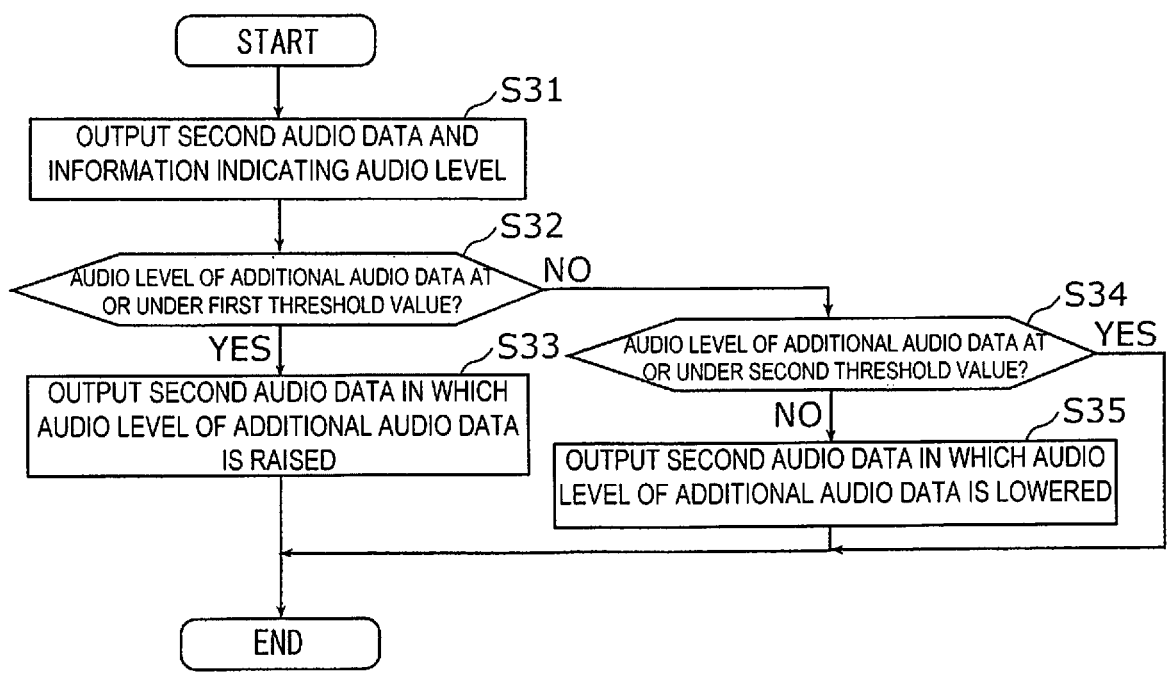
FIG. 5 is a flowchart showing the operation of the playback device in accordance with the third embodiment.

The operation of the second decoder 22 and the second processor 32 in the playback device 3 configured as described above will now be described through reference to FIGS. 1, 2 and 5. Here is shown the operation up to the output of the second audio data in which the second processor 32 has adjusted the audio level from the additional audio data inputted to the second decoder 22. FIG. 5 is a flowchart showing the operation of the playback device 3 pertaining to the third embodiment.

As shown in FIGS. 1, 2, and 5, first, the second decoder 22 generates the second audio data and the information indicating the audio level by calculating the audio level of the additional audio data inputted from the controller 10, and outputs the second audio data and the information indicating the audio level (S31).

Next, the second audio data and the information indicating the audio level are inputted to the second processor 32. The second processor 32 then determines whether or not the audio level of the additional audio data is at or under the first threshold value (S32).

Next, if the second processor 32 determines that the audio level of the additional audio data is at or under the first threshold value (Yes in S32), then the second processor 32 generates second audio data in which the audio level of the additional audio data has been raised, and outputs this second audio data (S33). In this step, for example, the second processor 32 can raise the audio level of the additional audio data up to about the audio level of the main audio data. The second audio data in which the audio level of the additional audio data has been adjusted is inputted to the first processor 31, and this flow is ended.

On the other hand, if the second processor 32 determines that the audio level of the additional audio data is above the first threshold value (No in S32), then the second processor 32 determines whether or not the audio level of the additional audio data is at or under the second threshold value (S34).

If the second processor 32 determines that the audio level of the additional audio data is above the second threshold value (No in S34), then the second processor 32 generates the second audio data in which the audio level of the additional audio data has been decreased, and outputs this second audio data (S35). In step S35, for example, the second processor 32 can lower the audio level of the additional audio data to about the audio level of the main audio data. The second audio data in which the second processor 32 has adjusted the audio level of the additional audio data is inputted to the first processor 31, and this flow is ended.

On the other hand, if the second processor 32 determines that the audio level of the additional audio data is at or under the second threshold value (Yes in S34), then the second processor 32 generates the second audio data without adjusting the audio level of the additional audio data, and outputs this second audio data to the first processor 31, and this flow is ended.

This flow can be performed between steps S21 and S22 in FIG. 3.

Action and Effect

Next, the action and effect of the playback device 3 in this embodiment will be described.

As described above, in the playback device 3 pertaining to this embodiment, the combiner 30 has the second processor 32 that generates the second audio data in which the audio level of the additional audio data has been raised, when the audio level of the additional audio data is at or under the first threshold value.

Thus, when the audio level of the additional audio data is at or under the first threshold value, the second processor 32 outputs to the first processor 31 the second audio data in which the audio level of the additional audio data has been raised. Therefore, if the audio level of the additional audio data is lower than the audio level of the main audio data, then the second processor 32 increases the audio level of the additional audio data to adjust it closer to the audio level of the main audio data. Therefore, a user who is blind or visually impaired can easily hear the additional audio.

Also, in the playback device 3 pertaining to this embodiment, when the audio level of the additional audio data is at or above the second threshold value that is higher than the first threshold value, the second processor 32 further generates the second audio data in which the audio level of the additional audio data has been lowered.

With this configuration, when the audio level of the additional audio data is higher than the audio level of the main audio data, the second processor 32 lowers the audio level of the additional audio data so as to adjust it closer to the audio level of the main audio data. Therefore, a user who is blind or visually impaired can easily hear the main audio and the additional audio.

Other actions and effects in this embodiment are the same as in the first embodiment, etc.

Modification Examples, etc.

The playback devices pertaining to one or more aspects are described above based on the first to third embodiments. However, the present invention is not limited to or by these embodiments. Without departing from the gist of the present invention, it will be apparent to those skilled in the field of playback devices from this disclosure that the scope of the present invention can encompass modes in which various modifications are applied to these embodiments and modes and modes created by putting together the constituent elements of different embodiments.

For example, in the first to third embodiments above, the second processor can control the second decoder so as to increase the volume of the additional audio data if the ratio of the audio level of the additional audio data to the audio level of the main audio data is at or under a specific threshold value. In this case, it is possible that the volume of the additional audio data will be too low with respect to the audio level of the main audio data. Thus, the second processor can raise the audio level of the additional audio data up to about the audio level of the main audio data.

Also, in the first to third embodiments above, if the playback speed of the additional audio data is too high or low, or if the volume is too high or low, so that the additional audio is hard to hear, then the user can adjust the playback speed of the additional audio data or adjust the volume of the additional audio data through the input component or the remote control.

Also, in the first to third embodiments above, the controller and the external device are connected by wire, but can instead connected wirelessly.

Also, in the first to third embodiments above, the playback device and the external device are connected in accordance with the HDMI standard, but can instead be connected according to some standard other than the HDMI standard. For instance, the playback device and the external device can be connected in accordance with DLNA™ (Digital Living Network Alliance) guidelines instead of the HDMI standard.

The above devices can each be configured as a computer system consisting of a microprocessor, ROM, RAM, hard disk drive, display unit, keyboard, mouse, etc. The RAM or the hard disk drive stores a computer program. The microprocessor operates according to the computer program, so that the various devices fulfill their functions. Here, the computer program is configured by combining a plurality of instruction codes indicating commands to the computer in order to achieve specific functions.

Furthermore, some or all of the constituent elements that make up the various devices can be made up of a single system LSI (large scale integrated circuit). The system LSI is a super-multifunctional LSI manufactured by integrating a plurality of components on a single chip, and includes, for example, a computer system made up of a microprocessor, a ROM, a RAM, etc. In this case, the ROM stores a computer program. The microprocessor operates according to the computer program, allowing the system LSI to achieve its functions.

Furthermore, some or all of the constituent elements that make up the various devices can be configured as an IC card or a single module that can be inserted into and removed from each device. The IC card or module is a computer system made up of a microprocessor, a ROM, a RAM, etc. The IC card or module can include the above-mentioned super-multifunctional LSI. The microprocessor operates according to the computer program, allowing the IC card or module to achieve its functions. The IC card or module can be tamper-resistant.

Also, the present invention can be the methods discussed above. Also, the present invention can be a computer program with which these methods are realized by a computer, or a digital signal composed of this computer program.

Furthermore, the present invention can be the product of recording the above-mentioned computer program or digital signal to a computer-readable non-transitory recording medium such as a flexible disk, hard disk, CD-ROM, MO, DVD, DVD-ROM, DVD-RAM, BD, or semiconductor memory. The present invention can also be the above-mentioned digital signal recorded to these non-transitory recording media.

The present invention can also involve transferring the above-mentioned computer program or digital signal over an electric communication line, a wireless or wired communication line, a network such as the Internet, data broadcasting, or the like.

The present invention can also be a computer system comprising a microprocessor and a memory, wherein the memory stores the above-mentioned computer program, and the above-mentioned microprocessor operates according to the above-mentioned computer program.

Also, the above-mentioned program or the above-mentioned digital signal can be recorded to the above-mentioned non-transitory recording medium and transferred, or the program or the digital signal can be transferred over the above-mentioned network or the like, and thereby implemented by another computer system that is independent.

Furthermore, the embodiments and the modification examples given above can be combined with one another.

The playback device pertaining to the present invention can be utilized for a digital video player or the like connected by a cable to a television.

[1] In view of the state of the known technology and in accordance with an aspect of the present invention, a playback device comprises a first decoder, a second decoder and a combiner. The first decoder decodes main audio data and outputs first audio data. The second decoder decodes additional audio data and outputs second audio data. The combiner mixes the first audio data with the second audio data. While a sampling frequency of the main audio data is different from a sampling frequency of the additional audio data, the second decoder adjusts a playback speed of the additional audio data based on the sampling frequency of the main audio data.

Thus, when the sampling frequency of the main audio data is different from the sampling frequency of the additional audio data, the second decoder adjusts the playback speed of the additional audio data based on the sampling frequency of the main audio data. Therefore, with this playback device, when the first audio data and the second audio data are mixed by the combiner, audio data can be outputted in which the playback speed of the additional audio data has been synchronized with the playback speed of the main audio data.

Therefore, the playback speed of the additional audio data can be synchronized with the playback speed of the main audio data.

[2] In accordance with a preferred embodiment according to the playback device mentioned above, while the sampling frequency of the additional audio data is higher than the sampling frequency of the main audio data, the second decoder increases the playback speed of the additional audio data.

With this configuration, since the second decoder increases the playback speed of the additional audio data, the playback speeds of the main audio data and the additional audio data can be synchronized.

[3] In accordance with a preferred embodiment according to any one of the playback devices mentioned above, while the sampling frequency of the additional audio data is lower than the sampling frequency of the main audio data, the second decoder decreases the playback speed of the additional audio data.

With this configuration, since the second decoder decreases the playback speed of the additional audio data, the playback speeds of the main audio data and the additional audio data can be synchronized.

[4] In accordance with a preferred embodiment according to any one of the playback devices mentioned above, the playback device further comprises a controller that determines whether the sampling frequency of the additional audio data is adjustable to the sampling frequency of the main audio data. In response to determining that the sampling frequency of the additional audio data is unadjustable to the sampling frequency of the main audio data, the controller adjusts the playback speed of the additional audio data based on the sampling frequency of the main audio data.

Because the controller thus adjusts the playback speed of the additional audio data based on the sampling frequency of the main audio data, the playback device can synchronize the playback speed of the additional audio data with the playback speed of the main audio data.

[5] In accordance with a preferred embodiment according to any one of the playback devices mentioned above, the combiner has a converter that generates the second audio data in which an audio level of the additional audio data is raised while the audio level of the additional audio data is at or below a first threshold value.

Thus, when the audio level of the additional audio data is at or below the first threshold value, a second processor outputs to a first processor the second audio data in which the audio level of the additional audio data is raised. Therefore, when the audio level of the additional audio data is lower than the audio level of the main audio data, the second processor raises the audio level of the additional audio data so that it approaches the audio level of the main audio data. Accordingly, a user who is blind or visually impaired can easily hear the additional audio.

[6] In accordance with a preferred embodiment according to any one of the playback devices mentioned above, the converter further generates the second audio data in which the audio level of the additional audio data is lowered while the audio level of the additional audio data is at or above a second threshold value that is higher than the first threshold value.

With this configuration, when the audio level of the additional audio data is higher than the audio level of the main audio data, the second processor lowers the audio level of the additional audio data so that it approaches the audio level of the main audio data. Therefore, it will be easier for a user who is blind or visually impaired to hear the main audio and the additional audio.

The present invention can be realized not only as a playback device comprising a characteristic processor such as this, but also as a playback method comprising a step of processing executed by a characteristic processor included in a playback device. It can also be realized as a program for causing a computer to function as a characteristic processor included in a playback device, or as a program that causes a computer to execute characteristic steps included in a playback method. It should go without saying that such a program can be distributed through a non-transitory computer-readable recording medium such as a CD-ROM (compact disk-read only memory) or over a communication network such as the Internet.

With the present invention, it is possible to synchronize the playback speed of additional audio data with the playback speed of main audio data.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A playback device comprising:
a first decoder that processes main audio data to output first audio data;
a microcomputer that processes additional audio data to output second audio data, the microcomputer including a text-to-speech (TTS) engine that generates the additional audio data according to a user operation relative to the playback device in accordance with a settable sampling frequency and a settable playback speed that are settable to the TTS engine, respectively; and
a data processor that combines the first audio data with the second audio data,
while a sampling frequency of the main audio data is different from a sampling frequency of the additional audio data, the microcomputer generating the second audio data to adjust a playback speed of the additional audio data based on the sampling frequency of the main audio data to synchronize the playback speed of the additional audio data with a playback speed of the main audio data,
the microcomputer further determining whether the sampling frequency of the additional audio data is adjustable to the sampling frequency of the main audio data by designating the settable sampling frequency that is settable to the TTS engine,
in response to determining that the sampling frequency of the additional audio data is unadjustable to the sampling frequency of the main audio data by designating the settable sampling frequency that is settable to the TTS engine, the microcomputer adjusting the playback speed of the additional audio data based on the sampling frequency of the main audio data to synchronize the playback speed of the additional audio data with the playback speed of the main audio data by designating the settable playback speed that is settable to the TTS engine independently of designating of the settable sampling frequency that is settable to the TTS engine,
the microcomputer further generating the additional audio data, and adjusting the playback speed of the additional audio data that has been generated by the microcomputer.

2. The playback device according to claim 1, wherein while the sampling frequency of the additional audio data is higher than the sampling frequency of the main audio data, a second decoder of the microcomputer generates the second audio data to increase the playback speed of the additional audio data.

3. The playback device according to claim 1, wherein while the sampling frequency of the additional audio data is lower than the sampling frequency of the main audio data, a second decoder of the microcomputer generates the second audio data to decrease the playback speed of the additional audio data.

4. The playback device according to claim 1, wherein the microcomputer that controls the first decoder and the data processor.

5. The playback device according to claim 4, wherein the microcomputer determines a multiple by which the playback speed of the additional audio data is adjusted.

6. The playback device according to claim 4, wherein the microcomputer generates first decode data indicative of an encoding type of the main audio data, and outputs the main audio data and the first decode data to the first decoder.

7. The playback device according to claim 6, wherein the first decoder generates the first audio data based on the main audio data and the first decode data.

8. The playback device according to claim 7, wherein the first decoder decodes the main audio data based on the first decode data to generate the first audio data.

9. The playback device according to claim 4, wherein the microcomputer generates second decode data indicative of a multiple by which the playback speed of the additional audio data is adjusted and an encoding type of the additional audio data, and outputs the additional audio data and the second decode data to a second decoder of the microcomputer.

10. The playback device according to claim 9, wherein the second decoder generates the second audio data based on the additional audio data and the second decode data.

11. The playback device according to claim 10, wherein the second decoder decodes the additional audio data based on the second decode data to generate the second audio data.

12. The playback device according to claim 4, wherein the microcomputer outputs the additional audio data based on an operational command to the playback device.

13. The playback device according to claim 1, wherein while the sampling frequency of the additional audio data is unadjustable to the sampling frequency of the main audio data, a second decoder of the microcomputer adjusts the playback speed of the additional audio data based on the sampling frequency of the main audio data.

14. The playback device according to claim 1, wherein the microcomputer generates the additional audio data with the sampling frequency that has been adjusted to the sampling frequency of the main audio data while the sampling frequency of the additional audio data is adjustable to the sampling frequency of the main audio data.

15. The playback device according to claim 1, wherein the microcomputer adjusts the playback speed of the additional audio data that has been generated by the microcomputer while the sampling frequency of the additional audio data is unadjustable to the sampling frequency of the main audio data.

16. The playback device according to claim 13, wherein the microcomputer generates the additional audio data based on an operational command to the playback device.

17. The playback device according to claim 16, wherein the microcomputer generates the additional audio data by converting text data indicative of the operational command to the playback device into the additional audio data.

18. The playback device according to claim 1, wherein the data processor has a converter that processes the second audio data to raise an audio level of the additional audio data while the audio level of the additional audio data is at or below a first threshold value.

19. The playback device according to claim 18, wherein the converter further processes the second audio data to lower the audio level of the additional audio data while the audio level of the additional audio data is at or above a second threshold value that is higher than the first threshold value.

* * * * *